United States Patent [19]

Engstrom et al.

[11] Patent Number: 5,093,085
[45] Date of Patent: Mar. 3, 1992

[54] FLUIDIZED BED REACTOR METHOD AND APPARATUS

[75] Inventors: Folke Engstrom, San Diego, Calif.; Reijo Kuivalaninen, Karhula, Finland

[73] Assignee: A. Ahlstrom Corporation, Karhula, Finland

[21] Appl. No.: 161,141

[22] Filed: Feb. 26, 1988

Related U.S. Application Data

[63] Continuation-in-part of Ser. No. 62,745, Jun. 16, 1987, abandoned, which is a continuation-in-part of Ser. No. 764,996, Aug. 12, 1985, abandoned.

[30] Foreign Application Priority Data

Aug. 28, 1984 [FI] Finland ................... 843385

[51] Int. Cl.$^5$ ................... F27B 15/09; B01J 8/18
[52] U.S. Cl. ................... 422/143; 110/165 A; 110/245; 222/457; 422/145; 422/311; 431/7; 431/15; 431/170; 432/78; 432/79
[58] Field of Search ................... 422/143, 145, 311; 110/245, 165 A, 243, 244; 34/57 A, 57 R; 431/170, 7, 328; 432/14, 58, 78, 79; 222/394, 195, 457

[56] References Cited

U.S. PATENT DOCUMENTS

| | | | |
|---|---|---|---|
| 2,684,869 | 7/1954 | Lapple | 222/637 |
| 3,266,788 | 8/1966 | Jukkola | 34/57 R |
| 3,370,938 | 2/1968 | Newman et al. | 422/142 X |
| 3,433,467 | 3/1969 | Thyer | 34/57 A |
| 3,578,296 | 5/1971 | Boucraut | 34/57 R X |
| 4,187,169 | 5/1980 | Euzen et al. | 208/157 |
| 4,196,676 | 4/1980 | Brown et al. | 110/245 |
| 4,227,488 | 10/1980 | Stewart et al. | 110/165 R |
| 4,303,023 | 12/1981 | Perkins et al. | 422/142 X |
| 4,330,502 | 5/1982 | Engström | 422/146 X |
| 4,469,247 | 9/1984 | Tompkins | 222/3 X |
| 4,517,162 | 5/1985 | Moss | 422/143 X |
| 4,535,706 | 8/1985 | Klaschka | 110/245 |

FOREIGN PATENT DOCUMENTS

| | | |
|---|---|---|
| 1057053 | 3/1954 | France . |
| 58-213107 | 12/1983 | Japan . |
| 1300935 | 12/1972 | United Kingdom . |
| 2133716A | 8/1984 | United Kingdom . |

*Primary Examiner*—Robert J. Warden
*Assistant Examiner*—Amalia Santiago
*Attorney, Agent, or Firm*—Nixon & Vanderhye

[57] ABSTRACT

Fluidized bed reactor method and apparatus for removal of coarse material from the reactor. The apparatus comprises a discharge device including a substantially vertical pipe portion connected at one end with an outlet opening in the reactor grid, and at another end to an aeration chamber containing a discharge opening located below the level of the grid outlet opening; and a device for supplying pressurized air in short blasts of 30 to 100 milliseconds, preferably at pressures of from 2.5 to 7.0 bar, into the aeration chamber in the direction of the discharge opening to remove the coarse material from the reactor. Low pressure fluidizing air may be supplied to the vertical pipe portion as well as the aeration chamber to return small particles in the discharge device to the fluidization zone of the reactor.

19 Claims, 4 Drawing Sheets

FLUIDIZED BED REACTOR METHOD AND APPARATUS

RELATED APPLICATIONS

This application is a continuation-in-part of copending application Ser. No. 062,745, filed June 16, 1987 now abandoned, which is a continuation-in-part of application Ser. No. 764,996, filed Aug. 12, 1985 now abandoned.

BACKGROUND AND SUMMARY OF THE INVENTION

The present invention relates to fluidized bed reactors of the type including a fluidization zone separated from an air chamber by a grid structure provided with an outlet opening for coarse material.

Coarse, non-inflammable material which must be removed is gathered in the lower part of the fluidized bed reactor. Discharging this coarse material from a reactor is problematic because:

the temperature of the material to be discharged is high, i.e., 700° to 1000° C. at which temperature the strength of the construction materials is low.

the bed material to be discharged contains both fine particles and coarse material. The aim is to discharge mainly the coarse material, e.g., ash, inert bed material, masonry and iron pieces that have come into the bed material with the fuel material or from the combustor itself. As the temperature and the particle size of the bed material to be discharged varies greatly, the flow properties of the material also change.

the amount of the material to be discharged from the reactor may exceed 50% of the input fuel flow whereby heat recovery becomes essential when considering the efficiency of the boiler.

In U.S. Pat. No. 3,397,657, there is disclosed an apparatus for discharge of coarse material. This apparatus comprises a pipe connected with an outlet opening in the grid. The operation of the apparatus is controlled by an adjustable baffle supplied in the inclined portion of the pipe. The non-homogenous nature of the material to be discharged results, however, in unreliable operation of the apparatus.

The object of the present invention is to provide a simple and reliable device for discharging ash and other coarse, mainly noncombustible material from the lower part of a reactor.

Another object of the present invention is to provide a discharging device which enables discharging of coarse material with minimized losses in still reactive carbonaceous material.

Still another object of the present invention is to provide a discharging device which enables the recovery of heat from discharged coarse material.

The apparatus according to one embodiment of the invention comprises a substantially J-shaped discharge device, which includes a vertical discharge pipe portion connected with the outlet opening in grid, an upwardly directed discharge opening positioned beneath the outlet opening in the air chamber below the grid, and an aeration space or chamber connecting the vertical pipe portion and the discharge opening. The device further comprises a mechanism for feeding pressurized air in short cycles upwardly into the aeration chamber.

In a second embodiment of the invention, an L-shaped discharge device is connected to the outlet opening such that the coarse material is discharged laterally into the air chamber below the grid. Pressurized air is also introduced laterally, in the direction of the discharge opening, into the aeration chamber connecting the vertical portion with the discharge opening.

In a third embodiment of the invention, a generally L-shaped discharge device is connected to the outlet opening in the grid, wherein the aeration chamber connecting the vertical discharge portion and the discharge opening extends upwardly and away from the vertical portion. Highly pressurized air is supplied, in the form of instantaneous blasts, into the aeration chamber in the direction of the discharge opening.

In a fourth, preferred embodiment, the aeration chamber, which connects the vertical discharge pipe and the discharge opening, extends away from the vertical pipe in opposite directions, and is inclined relative to horizontal. In other words, the discharge device itself has a shape substantially in the form of an upside down T with an inclined crossbar. As in the previously described embodiment, the aeration chamber is inclined so that the end containing the discharge opening is higher than the other, or lower end. The extended lower end of the inclined aeration chamber increases the volume of coarse material which can be discharged with a single air blast. Preferably, the aeration chamber as a whole should be able to hold the same quantity of coarse material as the vertical discharge pipe.

Again, highly pressurized bursts of air are directed into the aeration chamber from the lower end of the aeration chamber and directed toward the discharge opening. By this arrangement, when the aeration chamber has been emptied by a blast of air, new coarse material flows firstly into the lower portion of the chamber and thereafter, into the upper portion of the chamber, provided the aeration chamber is not too steeply inclined. The angle of inclination of the aeration chamber relative to horizontal has to be large enough to hold an optimum amount of coarse material in the upper portion partly to inhibit air from the air chamber (which is at a higher pressure) from flowing into the discharge device. Coarse material in the upper portion of the aeration chamber serves to block this reverse flow of air.

The inclined aeration chamber also poses little risk of coarse material being stuck at the upper or discharge end. Moreover, a baffle which normally closes the discharge opening will remain in a normally closed position due to its own weight, and the higher pressure in the air chamber assists in this regard. To even further ensure that the baffle will remain closed during the lull between air blasts, the weight of the baffle may be increased.

In the preferred embodiment, fluidizing air is added at spaced locations along the vertical pipe portion of the discharge device, as well as in the inclined aeration chamber. The addition of fluidizing air, at very low pressure, removes the finest of particles (those not to be discharged) and returns them to the reactor. It is desirable, of course, to return this fine material to the reactor since it contains combustible carbonaceous material. Best results have been obtained with fluidizing air added in at least the lowermost portions of the vertical pipe and in the aeration chamber. It will be further appreciated that the fluidizing air may be used to cool the discharge pipe and/or aeration chamber.

Preferably, the air pulse pressure in each embodiment is in a range between 2.5 and 7 bar. This range is effective because even the very coarse material is easily discharged by air at the upper end of the pressure range (without negative effects on reactor performance or undue wear). At the same time, the pressure should not be lower than abort 2.5 bar to ensure discharge of coarse material and not primarily the fine materials which would be discharged at very low pressures.

It is also preferred that the air pulses or blasts have a duration of about 30-100 milliseconds. These very short high pressure pulses or blasts need only about 10 liter of air/gas to discharge the material from the aeration chamber into the air chamber. This is advantageous since the small additional quantities of air entering the air chamber have no detrimental effects on the flow of air from the air chamber through the grid into the fluidized bed chamber, nor on the heat exchange normally occurring in the air chamber.

The most significant advantage of the present invention compared to known applications is that, essentially, it does not employ any members moving in the material flow to be discharged.

Other significant advantages are that the discharge device per se is relatively inexpensive;

it is possible to have a number of discharge devices installed in different configurations depending on the particular circumstances;

the discharge device is easily and quickly installed in various reactor designs, including older combustors;

the discharge device minimizes losses of carbonaceous material discharged along with the coarse material; and only minimum amounts of air are needed to blast the coarse material out of the aeration chamber, which, in turn, minimizes negative effects on boiler efficiency.

Other objects and advantages will become apparent from the detailed description which follows.

DETAILED DESCRIPTION OF THE INVENTION

Figure 1:
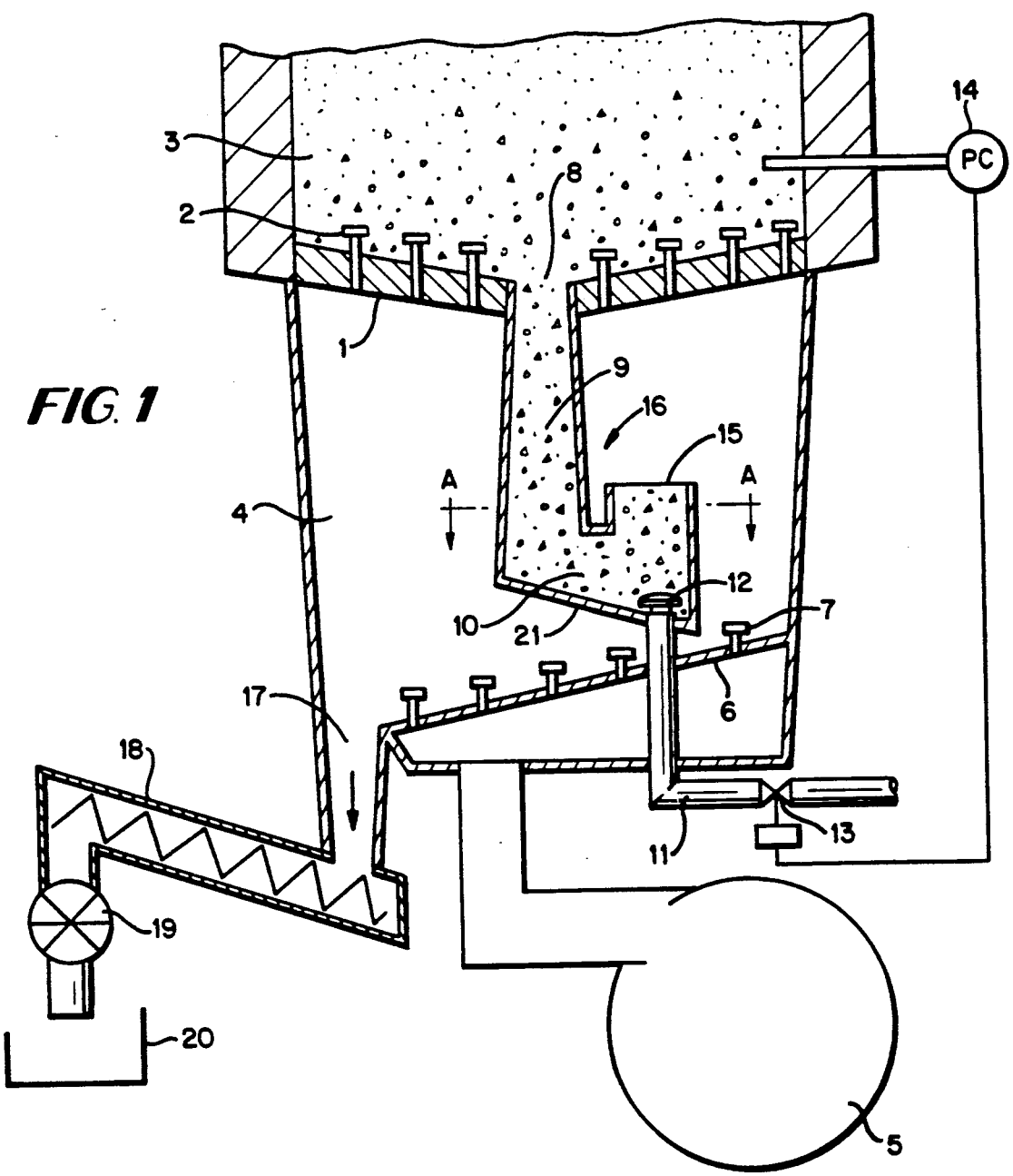
FIG. 1 is a vertical sectional view of an embodiment of the invention.
Figure 2:
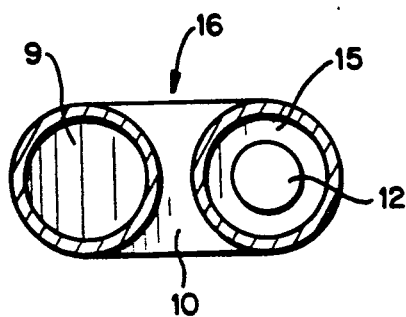
FIG. 2 is a sectional view taken along line A—A of FIG. 1.

FIGS. 1 and 2 illustrate the bottom part of a fluidized bed reactor provided with an inclined grid 1. The grid 1 is provided with several nozzles 2 by which combustion and fluidization air is evenly distributed from an air chamber 4 below the grid into a fluidization zone 3 above the grid. Air is supplied into the air chamber 4 from a fan 5 through an inclined cooling grid 6 provided with air nozzles 7. At the center of the grid 1 there is an outlet opening 8 for discharge of coarse material to a vertical discharge pipe 9. The lower end of the vertical pipe 9 merges with a substantially horizontal portion which defines an aeration space or chamber 10, the bottom 21 of which is inclined. The aeration space or chamber is provided with an upwardly directed discharge opening 15. The pipe 9 and the space 10 with its discharge opening 15 form a J-shaped discharge device 16. An air nozzle 12 connected with a pressurized air pipe 11 is disposed in the bottom 21 of the aeration space below the discharge opening 15. The pipe 11 is provided with a valve 13 which operates intermittently, the operation of which is controlled by a regulator 14 which measures the pressure in the fluidized bed above the grid. An outlet 17 in the bottom of the air chamber 4 leads to a screw transporter 18 connected with a rotary feeder 19; a transporter 20 is provided under the rotary feeder.

An apparatus according to the FIGS. 1 and 2 operates in the following way:

The coarse material, e.g., ash, in the J-shaped discharge device 16 beneath the grid forms a trap which prevents air from flowing this way from the air chamber 4 into the fluidized bed 3 the pressure in which is lower than that in the air chamber. Ash is removed from the reactor by feeding in pressurized air in pulses, at a pressure preferably between 2.5 and 7 bar, through air nozzle 12 into the aeration space 10 whereby the material in the discharge device 16 becomes fluidized and flows through the discharge opening 15 and out into the air chamber 4. The air pulse is short, e.g., 30-100 milliseconds, thus only a part of the coarse ash is discharged. The ash is cooled in the air chamber by air flowing through the cooling grid 6 and is discharged via outlet 17, screw 18 and rotary feeder 19 onto transporter 20. The pressure in the fluidized bed is measured and the regulator controls the amount of the ash removed from the reactor by regulating the frequency of the air pulses, e.g., a pulse every 0.1 to 10 minutes.

As the discharge device 16 feeds the ash into the air chamber 4 where it is in contact with the air flowing into the combustion space of the reactor, heat is recovered immediately under the grid.

The discharge device 16 can be water-cooled or masonry. It may include several discharge openings 15 arranged about the downward pipe 9, or an annular opening surrounding, i.e., concentric with the pipe 9. Large reactors are preferably provided with several discharge devices 16. The size of the outlet opening 8 is determined by the largest piece to be discharged. The diameter of the outlet opening is preferably at least 20% wider than the largest piece to be removed. In order to prevent the pipe from being clogged, the pipe 9 preferably expands in the downward direction or is wider than the outlet opening 8.

Figure 3:
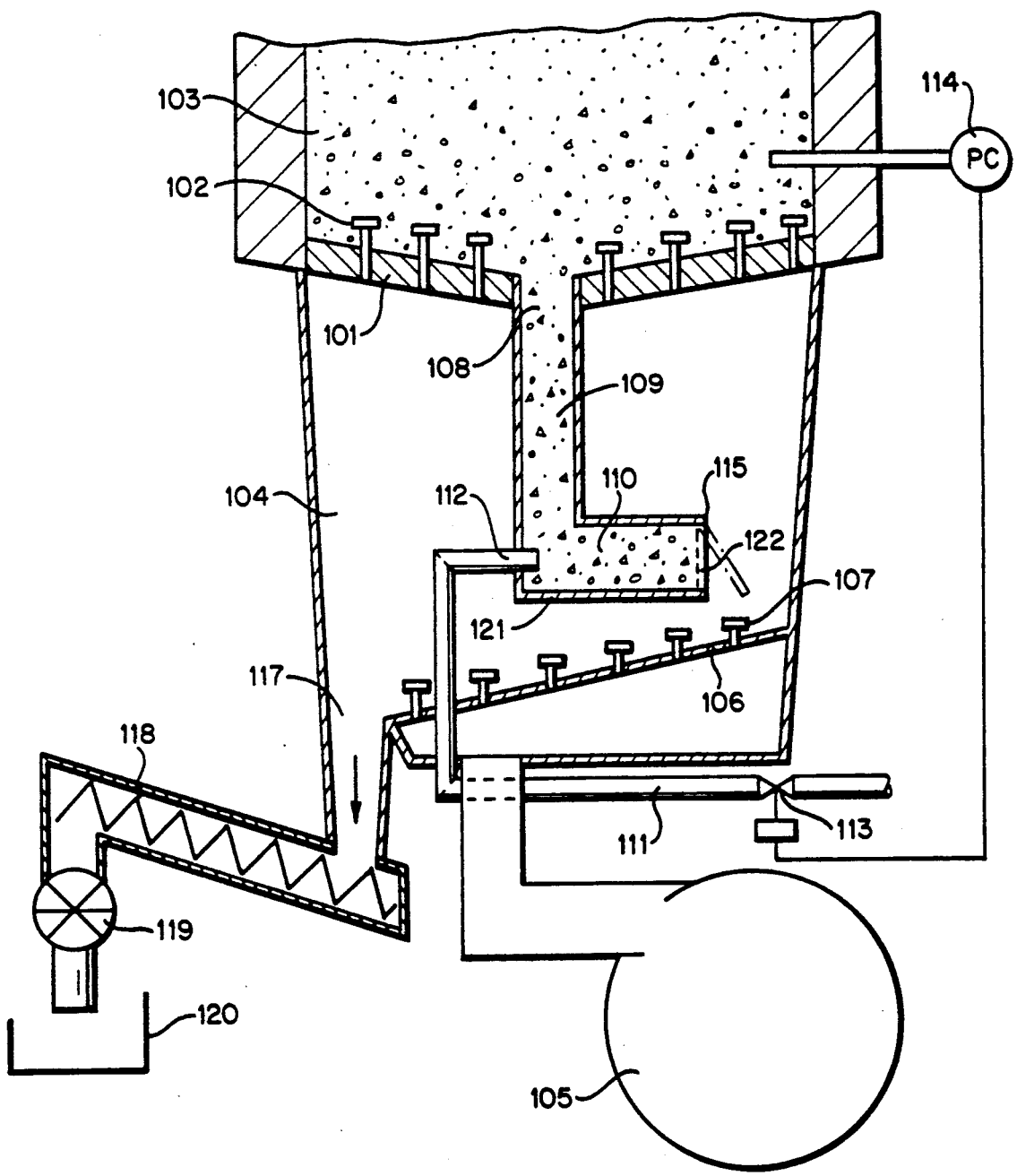
FIG. 3 is a vertical sectional view of another embodiment of the invention.

In FIG. 3, an alternative embodiment is illustrated wherein components in common with the FIG. 1 embodiment have the same reference numbers, but prefaced by a 1 or 10 so as to form a three-digit number.

In this alternative embodiment, a vertical pipe 109 is connected to the outlet opening 108 of the grid 101 and, together with an aeration space or chamber 110, forms an L-shaped discharge device 116. The discharge opening 115 of the discharge device is directed horizontally. A pivotally mounted closing baffle 122 is supplied in front of the discharge opening, and is opened by the outflowing ash. An air nozzle 112, which is connected with a pressurized air pipe 111, is oriented in an end of the aeration space or chamber opposite the discharge opening, to direct pressurized air through the aeration chamber towards the discharge opening. The apparatus illustrated in the FIG. 3 otherwise contains similar components and operates substantially in the same way as the apparatus illustrated in FIG. 1.

Figure 4:
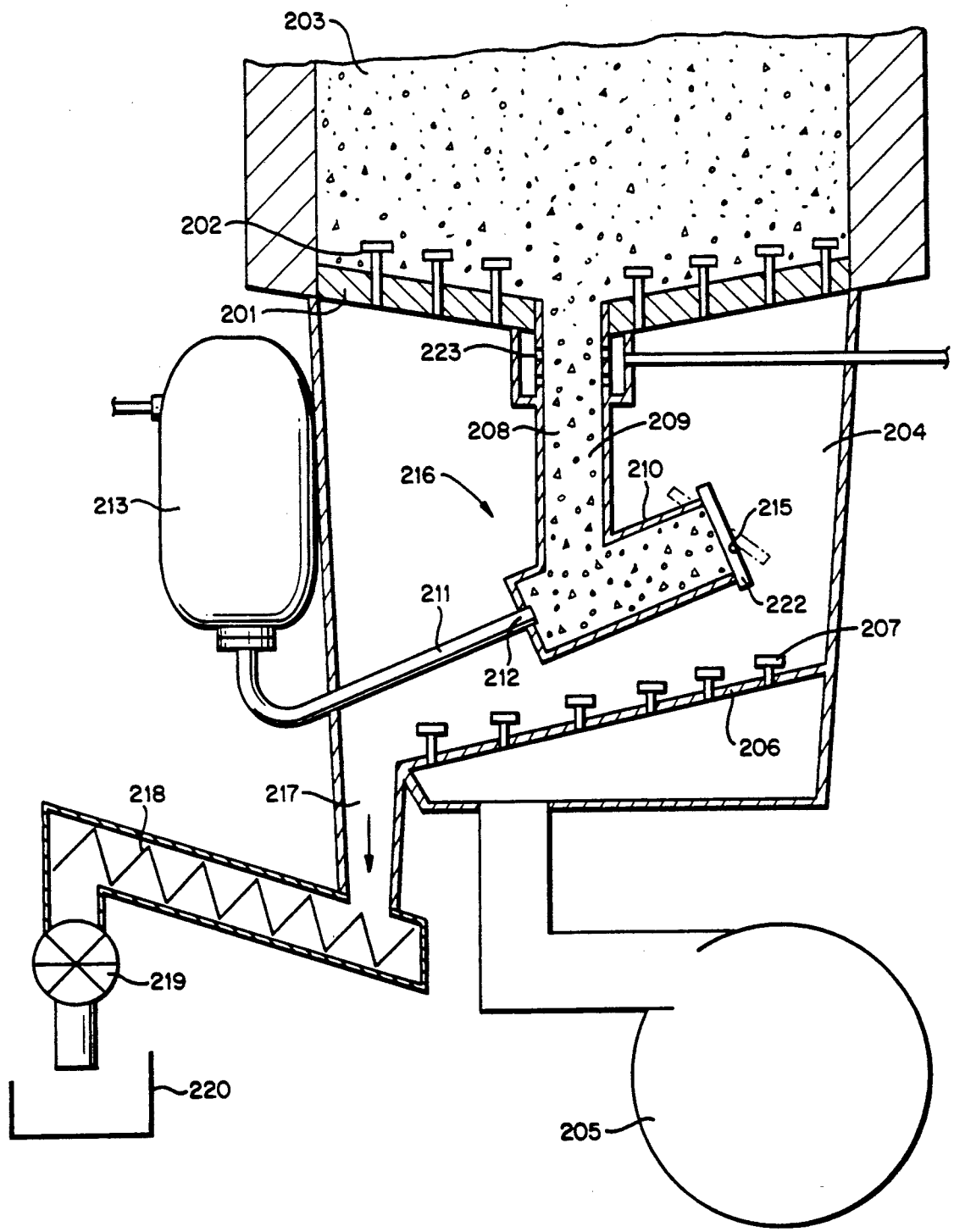
FIG. 4 is a vertical sectional view of still another embodiment of the invention.

In still another embodiment, illustrated in FIG. 4, (using generally like reference numerals as in FIG. 3 but prefaced by a "2" to denote common or corresponding components), a vertical pipe section 209 is connected at one end to the outlet opening 208 of the grid 201, and at the other end to a pipe portion defining an aeration space or chamber 210, which, together, form a generally L-shaped discharge device 216. The aeration space or chamber 210 thus connects pipe 209 with a discharge opening 215 which opens into an air chamber 204. Discharge opening 215 is directed generally sideways but also inclined upwardly away from the vertical pipe 209. A baffle 222 is pivotally disposed in front of the discharge opening 215, and is designed to normally close the discharge opening by gravity, although it may also be spring-mounted to assume a normally closed position. In its closed position, backflow of air from the air chamber 204 through the discharge device 216 is prevented. The baffle 222 opens upon the outflow of ash from the discharge device 216 as further described hereinbelow.

Compressed air is introduced into the end of aeration chamber 210 remote from the discharge opening 215, via a conduit 211 and nozzle 212 which is connected to a compressed air tank 213, which may be a "Direct Blast" aerator made by Global Manufacturing, Inc., and which is described in U.S. Pat. No. 4,469,247.

The air is preferably supplied at pressures from 2.5 to 7.0 bar in blasts or pulses of 30–100 milliseconds as previously described.

As in the previous embodiments, air is supplied to the air chamber 204 by a fan 205. The air travels through a plurality of nozzles 207 mounted in the inclined grid 206.

Additional air, supplied via conduit 224, can be blown into the upper end of the vertical discharge pipe 209 through openings or apertures 223, in order to return fine particles from the discharge pipe to the fluidization zone 203 of the reactor.

Similar to the previously described embodiments, an outlet 217 in the bottom of chamber 204 leads to a screw transporter 218 which, in turn, is connected to a rotary feeder 219 located above a transporter 220.

Figure 5:
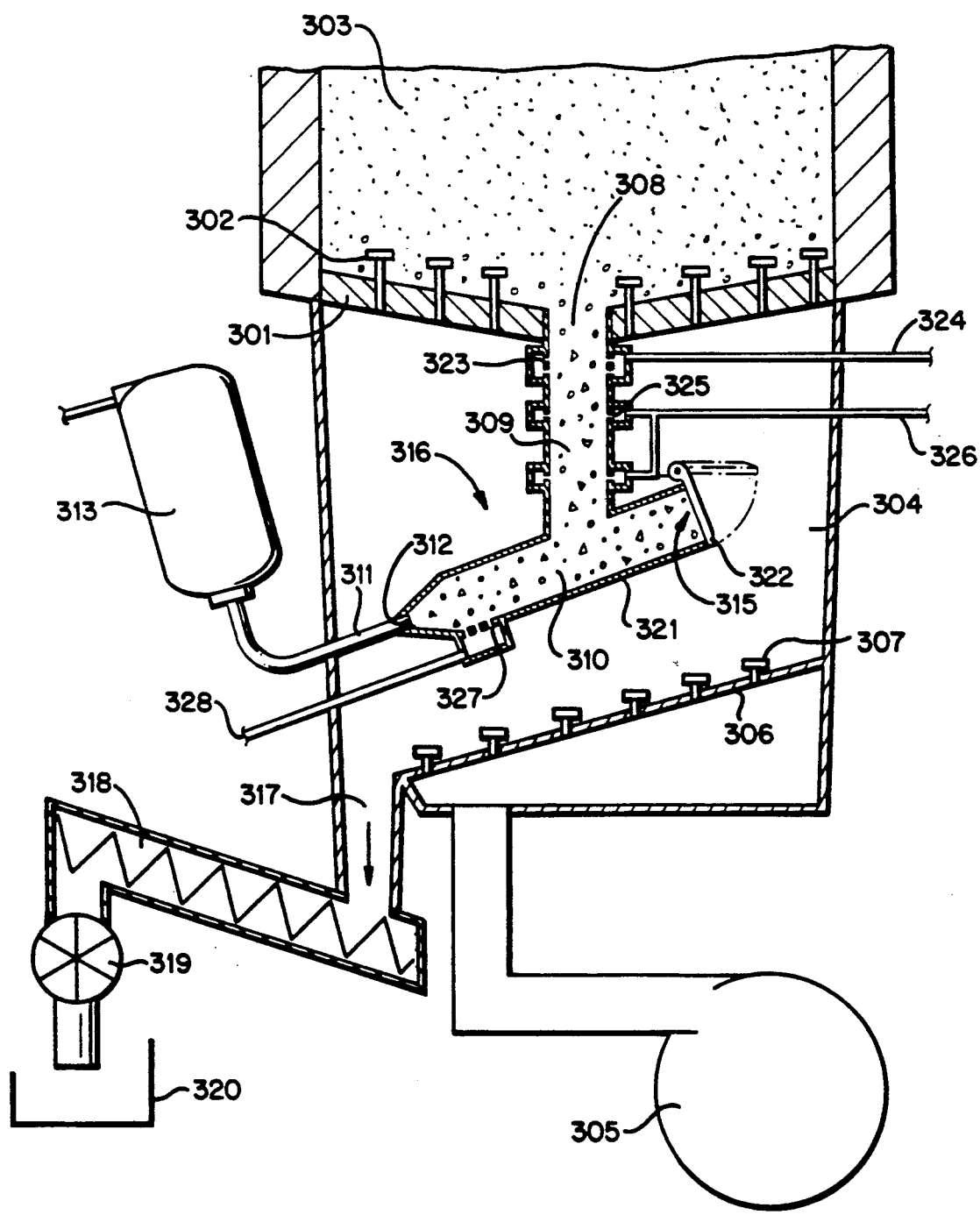
FIG. 5 is a vertical sectional view of the preferred embodiment of the invention.

FIG. 5 illustrates a preferred embodiment of the invention wherein identical reference numerals denoting elements in common with the FIG. 4 embodiment are utilized, but prefaced with a "3".

Air from fan 305 is fed into the air chamber 304 via nozzles 307 formed in a lower grid 306.

The vertical discharge pipe 309 is connected at its upper end to outlet opening 308 in the grid 301. Pipe 309 terminates at its lower end in an inclined duct which defines an aeration space or chamber 310. The space or chamber 310 extends away from the vertical pipe 308 in two opposite directions, and approximately to the same extent. The resulting arrangement of the discharge device 316 is that of an upside down T, having an inclined cross bar.

The lowermost end of the aeration space or chamber 310 is substantially closed, with the exception of a pressurized air/gas pipe 311 which feeds air/gas under pressure tank 313 into the space 310 via nozzle 312.

At the other, or uppermost, end of aeration chamber 310 is a discharge opening 315, normally closed by pivotally mounted baffle 322.

As previously indicated, in this preferred embodiment, the aeration chamber 310 is thus given a configuration which increases the amount of coarse material which can be discharged with a single blast of air from the tank 313. Once emptied, coarse material discharged through opening 308 builds up, first in the lower and then the upper portions of chamber 310.

Additional fluidized air can be supplied by any one of conduits 324, 326 connected to the vertical pipe 309 via manifolds 325, and conduit 328 which supplies air to the lower end of aeration space 310 via manifold 327.

As in the previously described embodiments, an outlet 317 in the bottom of chamber 304 leads to screw transporter 318, rotary feeder 319 and transporter 320.

In operation, compressed air at a pressure of about 2.5–7.0 bar is introduced into the aeration space 310, in a direction towards the discharge opening 315. The air is released instantaneously, on command, from the air tank 313, which, as in the case of the FIG. 4 embodiment, may be a "Direct Blast" aerator as previously described. The air is injected into the aeration space, or chamber 310 through a pipe 311 and blows the material in the aeration chamber through the discharge opening 315 where it is dispersed and rapidly cooled before it falls to the bottom of the air chamber 304. Here, the material is further cooled on the inclined cooling grid 306 by air supplied by fan 305 through air nozzles 307.

As previously mentioned, air from aerator 313 is released instantaneously at about 2.5–7.0 bar, so that a full tank is released within about 30–100 milliseconds. The tank thereafter is refilled with air from a compressor (not shown). It will thus be understood that the aerator is used only intermittently as necessary.

The impact of the air blast from aerator 313 opens the baffle 322 and thrusts out coarse material which otherwise blocks the aeration chamber 310. Since the acceleration of the air or gas is higher than that of the particulate material, a small amount of air or gas is discharged through the opening first, so that the baffle is opened by a gas blast rather than a particle blast, thus enhancing the durability of the baffle. In addition, particles which may have sintered to the walls of the duct are dislodged by the shear forces of the outflowing material. Because the outflowing material is rapidly cooled, combustion of combustable components and sintering of the material on the bottom of the air chamber is prevented.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. In a fluidized bed reactor having a grid provided with a plurality of nozzles by which combustion and fluidization air is evenly distributed from an air chamber disposed below the grid to a fluidization zone above the grid, and wherein the grid is provided with an outlet opening for coarse material, the improvement comprising:

at least one discharge device including a vertical pipe portion connected at one end to said outlet opening and at the other end to an aeration chamber extending angularly with respect to said vertical pipe portion;

said aeration chamber provided at one end with a coarse material discharge opening which opens into said air chamber, and at an opposite end with means for supplying intermittent and substantially instantaneous air blasts of about 2.5 to 7.0 bar into said aeration chamber and directed towards said coarse material discharge opening, such that said aeration chamber is substantially emptied of said coarse material with each blast.

2. Apparatus as recited in claim 1 wherein said means for supplying the substantially instantaneous air blast is capable of supplying said air blasts for durations of approximately 30-100 milliseconds.

3. Apparatus as recited in claim 1 and further comprising a baffle pivotally mounted in front of said coarse material discharge opening.

4. Apparatus as recited in claim 1 wherein said coarse material discharge opening end is directed upwardly.

5. Apparatus as defined in claim 1 wherein said air chamber has a bottom surface including an inclined cooling grid.

6. Apparatus as defined in claim 5 wherein said inclined cooling grid is provided with a plurality of air nozzles through which air is supplied from a cooling fan.

7. Apparatus as defined in claim 6 wherein said cooling grid further comprises an outlet leading to a transport means.

8. Apparatus as defined in claim 1 and further including means for supplying fluidizing air into an upper end of said vertical pipe portion for returning fine particles to said fluidization zone.

9. Apparatus as defined in claim 1 and further including means for supplying fluidizing air into a lower portion of said aeration chamber for returning fine particles to said fluidization zone.

10. Apparatus as defined in claim 1 and further including means for supplying fluidizing air into a lower end of said vertical pipe portion for returning fine particles to said fluidization zone.

11. Apparatus as defined in claim 1 and wherein said aeration chamber extends angularly relative to said vertical pipe portion, and substantially equally in two opposite directions on either side of said vertical pipe portion.

12. Apparatus as defined in claim 1 wherein the vertical pipe portion and aeration chamber have substantially equal volumes.

13. In a fluidized bed reactor having a grid provided with a plurality of nozzles by which combustion and fluidization air is evenly distributed from an air chamber disposed below the grid to a fluidization zone above the grid, and wherein the grid is provided with an outlet opening for coarse material, the improvement comprising:
at least one discharge device including a vertical pipe portion connected at one end to said outlet opening and at the other end to an aeration chamber extending angularly with respect to said vertical pipe portion substantially equally in two opposite directions;
said aeration chamber provided at a lowermost end with means for supplying intermittent and substantially instantaneous blasts of air into said aeration chamber, and at an uppermost end with a discharge opening which opens into said air chamber, each said blast substantially emptying said coarse material from said aeration chamber.

14. Apparatus as defined in claim 13 wherein said means supplying a substantially instantaneous blast of air comprises an aerator capable of supplying air blasts of about 2.5-7.0 bar and about 30-100 milliseconds in duration.

15. Apparatus as defined in claim 13 and further including additional means for supplying fluidizing air into the vertical discharge pipe portion and the aeration chamber for returning fine material to the fluidization zone.

16. A method for discharging coarse material from a fluidized bed reactor having a grip provided with a plurality of nozzles by which combustion and fluidization air is evenly distributed from an air chamber disposed below the grid to a fluidization zone above the grid, and wherein the grid is provided with an outlet opening for coarse material, comprising the steps of:
(a) providing at least one discharge device including a vertical pipe portion connected at one end to said outlet opening, and at the other end to an aeration chamber extending angularly with respect to said vertical pipe portion, said aeration chamber provided at one end with a discharge opening, and at an opposite end with means for supplying pressurized air into said aeration chamber;
(b) periodically supplying pressurized air in the form of substantially instantaneous blasts into said aeration chamber to discharge substantially all of the coarse material in the aeration chamber from the reactor with each blast, and wherein each said blast of air is supplied at about 2.5-7.0 bar.

17. A method as recited in claim 16 wherein said instantaneous blasts of air have a duration of about 30-100 milliseconds.

18. A method as defined in claim 16 and including the further step of supplying fluidizing air into at least a lower end of said vertical pipe portion for removing fine particles from said material to be discharged, and returning the fine particles to the fluidization zone.

19. A method as defined in claim 16 and including supplying fluidizing air into upper and lower portions of said vertical pipe portion, and said aeration chamber, for removing fine particles from said material to be discharged, and returning the fine particles to the fluidization zone.

* * * * *